United States Patent Office 3,139,418
Patented June 30, 1964

3,139,418
THREE COMPONENT CATALYST FOR POLYMERIZATION OF 1-OLEFINS CONTAINING TITANIUM HALIDE, ALUMINUM ALKYL, AND PYRIDINE
Gerlando Marullo, Alessandro Baroni, and Umberto Maffezzoni, Novara, Italy, assignors to Montecatini Societa Generale per l'Industria Mineraria e Chimica, a corporation of Italy
No Drawing. Filed Dec. 19, 1958, Ser. No. 781,465
Claims priority, application Italy Dec. 23, 1957
7 Claims. (Cl. 260—93.7)

This invention relates to an improved process for polymerizing unsaturated hydrocarbons, and to catalysts for use in such process.

It has been disclosed that ethylene, the alpha-olefins such as propylene, and diolefins can be polymerized using catalysts obtained by reacting transition metal compounds with organometallic compounds.

It is known, also, from the disclosures of G. Natta et al. that the course of the polymerization, and the characteristics of the polymers produced, depend on the particular transition metal compound and organometallic compound which are reacted together to form the catalyst. Thus, while the catalyst prepared from $TiCl_4$ and $Al(C_2H_5)_3$ is very effective as catalyst for the polymerization of ethyene, it is (as shown by Natta et al.) less effective in the polymerization of the alpha-olefins, e.g., propylene and butene-1, while with butadiene it results in the production of mixtures consisting of polymers having the various structures which are possible for a polybutadiene.

As Natta et al. have proved, catalysts prepared from solid, highly crystalline halides of the transition metals in which the metal has a valency not higher than 3, such as $TiCl_3$ and $Al(C_2H_5)_3$ are more effective catalysts for the polymerization of the alpha-olefins and have the capacity to orient the polymerization of propylene, butene-1, etc. to the direct production of polymerizates prevailingly consisting of isotactic macromolecules as defined by Natta et al.

In the last-mentioned catalytic system, the crystalline $TiCl_3$ is insoluble in the inert hydrocarbon used as the polymerization medium, and both the polymerization rate and the yield of polymer based on the given amount of catalyst used are considerably influenced by the initial size of the $TiCl_3$ crystals.

The catalyst based on $TiCl_3$ is formed, or at least becomes active, after a certain time from the moment in which the components, including the olefin to be polymerized, are brought into contact, and this determines a certain period of inactivity (induction period) during which, despite the presence of the olefin, polymerization does not occur or occurs at a very low rate.

Various methods have been disclosed for eliminating the induction period and increasing the initial activity of the catalyst based on the crystalline transition metal halides. Such methods involve physical treatments of the catalyst, or the addition of various substances to the catalytic system.

One object of this invention is to provide a new and improved method for increasing the initial activity of the catalysts based on the crystalline transition metal halides.

Another object is to provide an improved process for polymerizing olefins with the catalysts based on the crystalline transition metal halides, which process does not involve any substantial induction period after the catalyst and olefin to be polymerized have been brought into contact.

These and other objects are accomplished by the invention in accordance with which it is found that the activity of the catalysts prepared from the crystalline transition metal halides and alkyl metal compounds can be increased by including organic amines, particularly primary amines, with the catalyst-forming components, or by incorporating the organic amines with the already formed catalyst.

We find that the organic amines form hydrocarbon-soluble complex salts with the transition metal halides. For instance, we find that by using 6 mols trimethylhexylamine per each mol of $TiCl_3$, complete solubilization of the compound is obtained.

Also, we find that organometallic compounds, such as alkyl aluminum compounds, form soluble complexes with the organic amines. Thus, triethyl aluminum and trimethylhexylamine yield a hydrocarbon-soluble complex when they are mixed in a mol ratio equal to 1.

The amines are effective to increase the activity of the catalysts prepared from the transition metal halides and organometallic compounds in small amounts between 0.05 and 0.2 mol per each mol of transition metal compound.

We find, further, that if an amount much higher than 0.2 mol per mol of the transition metal compound is used, the activity of the catalyst is decreased to an extent proportional to the amount of amine added. However, in that case it is possible to reactivate the catalyst by the addition of further organometallic compound to it. For example, the activity of the catalyst prepared from $TiCl_3$ and $Al(C_2H_5)_3$ in a mol ratio of 1:2 is strongly depressed by the addition thereto of trimethylhexylamine in a proportion of 1.0 mol per each mol of $TiCl_3$, but is restored by adding $Al(C_2H_5)_3$ in an amount sufficient to adjust the $Al(C_2H_5)_3/TiCl_3$ ratio to 3:1.

In practice, the activated catalysts of the present invention are particularly useful in the polymerizaiton of aliphatic alpha-olefins such as propylene, butene-1, pentene-1.

When the catalysts activated by the organic amine are used, the induction period is entirely eliminated and the polymerization proceeds at a much faster rate.

The addition of the amine can be made in any convenient or desired manner. Thus, the transition metal compound may be contacted with the amine before the former is mixed with the organometallic compound, the organometallic compound may be mixed with the amine followed by the addition of the transition metal compound to the mixture, or the amine may be added to the catalyst prepared by mixing the transition metal compound with the organometallic compound. Regardless of how the amine is incorporated in the catalyst, an increase in activity of the catalyst is observed. The presently preferred procedure, however, is to mix the amine with the transition metal compound and then add the organometallic compound to the mixture.

When the transition metal compound is insoluble in hydrocarbons, the amine can be added to a suspension of the transition metal compound in the inert hydrocarbon, and the mixture can be agitated for 15 to 30 minutes before adding the organometallic compound thereto.

When a hydrocarbon-soluble transition metal compound is used, it is preferred to first mix the transition metal compound with the organometallic compound and then add the amine to the resulting catalyst.

The amine used can be an aliphatic, cycloaliphatic or aromatic amine. The primary amines are particularly effective for eliminating or reducing the induction period in the polymerization process, and, therefore, are preferred.

Secondary and tertiary amines, and cyclic amines such as pyridine, piperidine, quinoline, etc. may also be used.

When the new activated catalytic systems of the invention are used in the polymerization of alpha-olefins, a marked increase is observed in some cases, in the amount of isotactic polymer contained in the polymerizate. This is particularly true when the alpha-olefin polymerized is propylene, and the amine included in the catalyst is an organic base such as pyridine, quinoline or the like. In other instances, the polymerizates produced have substantially the same characteristics as those normally produced using the catalysts prepared from the transition metal compounds and organometallic compounds, other conditions being equal, but the polymerization rate is accelerated due to the activation of the catalyst resulting from the use of the amine.

Diolefins can be polymerized with the activated catalysts of the invention. The diolefin polymers thus obtained have a uniform appearance, exhibit properties varying from those of a plastic to those of an elastic material, depending on the amount of amine, and the specific amine, used in preparing the catalyst, and are easily soluble in such solvents as benzene, toluene, heptane, carbon disulfide, etc.

This is in contrast to the polymers obtained by polymerizing the diolefins in the presence of the catalysts prepared from the transition metal compounds and organometallic compounds, without the inclusion of an amine. In general, those polymers are granular or filamentous, have a non-uniform appearance, and are insoluble or substantially insoluble in benzene, toluene, heptane, carbon disulfide, etc., in which, generally speaking, the polymers only tend to swell.

The following examples are given to illustrate the invention. It is to be understood that these examples are not intended to be limiting.

EXAMPLE 1

Proplene is polymerized in an autoclave using commercial anhydrous heptane as dispersing medium for the catalyst.

The catalyst is prepared from 0.85 g. titanium trichloride and 1.254 g. triethyl aluminum (Al/Ti mole ratio=2), its concentration in the solvents is 3.1 g./liter. The polymerization is carried out under pressure of 6.5 atm. of propylene at 75° C. for 10 hours.

The polymer discharged from the autoclave, washed and dried, amounts to 358 g., corresponding to 170 g. polypropylene per gram of catalyst used.

The polymer subjected to extraction with boiling heptane for 24 hours leaves an insoluble residue amounting to 84%.

A second run is carried out under the same conditions as those described above except that the catalyst is prepared by adding 0.224 g. pyridine to the suspension of 0.855 g. titanium trichloride in 100 ml. commercial anhydrous heptane ($C_5H_5N$/Ti mole ratio=0.5) and agitating said suspension for 15 to 30 minutes before introducing 1.264 g. triethyl aluminum.

After polymerization for 4 hours 534 g. of washed and dried polymer are obtained, corresponding to 250 g. polypropylene per gram of total catalyst used.

A third run is carried out by preparing the catalyst as follows: 0.22 g. pyridine are contacted with 1.261 g. triethyl aluminum in 100 ml. commercial anhydrous heptane and the solution thus obtained is added to 0.854 g. titanium trichloride. The Al/Ti mole ratio is 2 and the $C_5H_5N$/Ti mole ratio is 0.5.

After polymerization for 10 hours, 363 g. of washed and dried polymer, corresponding to 172 g. polypropylene per gram of total catalyst employed, are obtained.

The polymer subjected to extraction with boiling heptane, leaves an insoluble residue of 91.5%.

EXAMPLE 2

The catalyst is prepared in a 4-neck glass flask, provided with stirrer, a 100 cc. dropping funnel, and a thermometer. Both flask and funnel are kept under perfectly dry, oxygen free nitrogen pressure in order to avoid any contact of the catalyst components with air and moistrue.

Through the funnel 0.522 g. trimethylhexylamine, diluted with 100 ml. anhydrous heptane are introduced into the flask and 1.686 g. triethyl aluminum diluted with 10 ml. heptane are then added dropwise, through the same funnel, while agitating.

Finally, 0.855 g. titanium trichloride suspended in 100 ml. heptane are introduced through the funnel and the mixture is agitated for some minutes. The amine/titanium mole ratio is 0.66 and the Al/Ti mole ratio is 2.66.

The catalyst suspension thus obtained is then introduced, avoiding any contact with air and humidity, into a 1800 cc. autoclave, containing 300 mole heptane at 65–70° C. The flask in which the catalyst suspension was contained is washed with 125 mole heptane, divided into 3 portions, and the washing liquid is charged in the autoclave, always under nitrogen.

Air had been previously removed from the autoclave by repeated flushing with propylene.

After having introduced all the catalyst, the introduction of propylene into the autoclave is started and the polymerization is carried out at 65–70° C. under a pressure of 6.5 atm. for 2 hours.

Thereafter, the reaction is stopped, the residual propylene is discharged and the reaction mixture is cooled. The polymer discharged from the autoclave is washed according to known techniques in order to remove the catalyst residue.

The dry polymer amounts to 73 g. and presents the characteristics reported in the table.

With a catalyst prepared according to the same technique, but without trimethylhexylamine, 55 g. dry polymer are obtained under the same conditions. The characteristics of both polymers are reported in the following table in which A indicates the results obtained in the presence of the amine.

*Table I*

|   | Intrinsic viscosity (in trichloro ethylene) at 135° | Crystallinity by X-rays, percent | Temp. at which birefringency disappears, °C. | Extraction at the boiling point ||||  G. of polymer, g. $TiCl_3$ |
|---|---|---|---|---|---|---|---|---|
|   |   |   |   | Acetone extract, percent | Ether ext., percent | Heptane ext., percent | Residue, percent |   |
| A | 3.1 | 59.4 | 165 | 0.94 | 9.47 | 4.38 | 85.21 | 85.3 |
| B | 2.98 | 59.6 | 165 | 0.99 | 9.11 | 4.35 | 85.55 | 64.7 |

EXAMPLE 3

In an autoclave of 1.4 liter capacity, fitted with a jacket and stirrer and heated to 75° C., a mixture of TiCl₃, 1.7 g. quinoline, 0.71 g. and aluminum triethyl, 2.5 g. in 1.5 liters of heptane is introduced.

Propylene is then added, up to a pressure of 6 atm. and the temperature is kept at about 75° C. Feeding of propylene is continued for 7½ hours at 75° C. 820 g. dry polymer are obtained, which has a molecular weight of 210,000. Extraction with ether leaves a residue of 91%, with boiling heptane of 84%.

When the same run is carried out without adding quinoline, after 10 hours only 750 g. dry polymer are obtained, having a molecular weight of 160,000, a residue after extraction with ether of 86%, and after extraction with boiling heptane of 74%.

EXAMPLE 4

1.3 liters n-heptane are introduced into a 4 liter autoclave fitted with a stirrer, and the autoclave is heated to 70° C.

A mixture of titanium trichloride, aluminum triethyl and pyridine is prepared separately as follows: the desired amount of titanium trichloride is suspended in a small amount (0.2 liter) of heptane at room temperature, pyridine is added and the whole is stirred for 15 minutes; then aluminum triethyl is added. After stirring for 5 minutes, the suspension is introduced in the autoclave under a nitrogen pressure.

Propylene is then introduced and polymerization is carried out for 10 hours, keeping a constant pressure of 5 to 7 atm. propylene.

The autoclave is then cooled, the residual propylene vented and the polymer is extracted from the autoclave. It is then washed with water and alcohol to destroy any catalyst residue.

In the table the results obtained are compared with those obtained in a run (A) without addition of pyridine to the catalyst.

| Run | Catalyst | | | Conditions | |
|---|---|---|---|---|---|
| | Al/Ti molar ratio | Ti/pyridine molar ratio | Total catalyst, g./l. | T, ° C. | Time, hours |
| A | 2 | --- | 2.8 | 70–75 | 10 |
| B | 2 | 2 | 2.8 | 70–75 | 10 |

| | Polymer obtained | | | |
|---|---|---|---|---|
| | Yield, g./g. catalyst | Mol weight | Residue after extraction with boiling heptane, percent | Flexural rigidity |
| A | 170 | 150,000 | 74 | 6,900 |
| B | 210 | 210,000 | 85 | 8,500 |

EXAMPLE 5

Into a 3 liter autoclave, provided with an agitator and a heating jacket in which oil is circulated, 3.08 g. TiCl₃ (0.02 mol) suspended in 1000 cc. benzene are introduced.

6.84 g. triethyl aluminum (0.06 mol) are then introduced and 480 g. butene-1 are added immediately thereafter.

The mixture is heated rapidly to 70° C. while stirring. About 4 hours after the beginning of the reaction it is noted that the pressure starts decreasing slowly, showing that polymerization has started. The pressure continues to decrease slowly until it is gradually reduced to zero, after 12 hours and 30 minutes.

At this point the catalyst is decomposed by introducing 50 cc. methanol into the autoclave. The autoclave is then opened, the polymer is precipitated with methanol and is then washed and dried.

380 g. polybutene (conversion 79.2%) having an intrinsic viscosity of 2.55 are obtained. By extraction, 74.5% of the product remains insoluble in ethyl ether.

In the same apparatus 4 polymerization runs are carried out under the same conditions, except that small amounts of primary 3,5,5-trimethylhexylamine are added to the TiCl₃ suspended in benzene and the mixture thus obtained is agitated for about 15 minutes before adding the triethyl aluminum and butene-1.

The amounts of amine added in the 4 runs were 0.572 g. (0.004 mol), 0.954 g. (0.0066 mol), 1.43 g. (0.01 mol) and 1.86 g. (0.013 mol) respectively.

In all these runs, as soon as heating is started, such a rapid start of the reaction is observed, as to require a very efficient circulation of cold oil in the autoclave jacket in order to keep the temperature at 70° C.

At the same time the pressure decreases quickly and, after 4 to 5 hours from the beginning of the reaction, is reduced to zero.

After having decomposed the catalyst by introducing 50 cc. methanol into the autoclave, the polymer is precipitated and washed with methanol and is then collected and subjected to the usual physico-chemical determinations. The results of these runs are reported in Table II below, together with those of the following examples.

EXAMPLE 6

In the same apparatus as described in Example 1, two polymerization runs are carried out under the following conditions. 3.85 g. TiCl₃ (0.023 mol) suspended in 1000 cc. benzene are introduced into the autoclave and 1.78 g. (0.0166 mol) primary benzylamine are added in the first run and 2.0 g. (0.0166 mol) beta-phenylethylamine in the second run.

In both runs TiCl₃ and the amine are agitated for about 15 minutes before adding 9.12 g. (0.08 mol) triethyl aluminum and then about 500 g. butene-1.

The mixture is heated to 70° C. with continuous agitation. In both runs, the polymerization starts almost immediately as the temperature reaches 70° C., an efficient cooling is necessary to prevent the temperature from exceeding the desired value. The pressure drops quickly and when it is reduced to zero, after about 6 hours of reaction, the catalyst is decomposed by introducing about 50 cc. methanol into the autoclave. The polybutene-1 obtained in both runs is precipitated and washed with methanol and dried in an oven at 40° C. The conversion in the two runs was 84.5% and 95.0% respectively.

The characteristics of these polybutenes are reported in Table II.

EXAMPLE 7

In the same apparatus as in Example 4, a polymerization run is carried out under the conditions mentioned in said example, except that 0.41 g. (0.013 mol) monomethylamine are added to TiCl₃ suspended in benzene and the mixture thus obtained is agitated for about 15 minutes before adding 6.84 g. (0.006 mol) triethyl aluminum and 490 g. butene-1.

The reaction starts so rapidly right after starting the heating, that the reaction temperature can be kept at 70° C. only with difficulty. Meanwhile, the pressure drops quickly and, after 4 hours and 30 minutes, is reduced to zero.

After having decomposed the catalyst by introducing 50 cc. methanol into the autoclave, the polymer is precipitated and washed with methanol and is then dried and weighed. 457 g. polybutene-1 (conversion 93.2%) having an intrinsic viscosity of 2.14, are obtained.

When the product is extracted with ether, 74.6% remains insoluble therein. The results are given in Table II.

Table II

| Example | Mole ratio Al(C$_2$H$_5$)$_3$/ TiCl$_3$ | Amine Type | Amine Mole | Mole ratio, amine/ Ti, Cl$_3$ | butene-1, g. | Intro- duction period, hours | Total reaction time, hours | Polybu- tene-1 pro- duced, g. | Con- version, percent | ($\eta$) | Separation by extraction acetone soluble, percent | Ethyl ether soluble, percent | Resi- due, percent |
|---|---|---|---|---|---|---|---|---|---|---|---|---|---|
| 5 | | In absence of amine 3. | | | 480 | 4 | 12.30′ | 380 | 79.2 | 2.55 | 1.80 | 23.70 | 74.50 |
| 5 | | With amine 3. 3,5,5-tri- methylhex- ylamine. | 0.004 | 0.2 | 500 | 0 | 4.15′ | 450 | 90.0 | 2.54 | 3.80 | 21.00 | 75.20 |
| 5 | | do | 0.0066 | 0.33 | 515 | 0 | 4.15′ | 440 | 85.3 | 2.40 | 2.20 | 24.50 | 73.30 |
| 5 | | do | 0.010 | 0.5 | 585 | 0 | 5 | 500 | 85.5 | 2.64 | 1.80 | 18.20 | 80.00 |
| 5 | | do | 0.013 | 0.66 | 525 | 0 | 4 | 470 | 89.6 | 2.78 | 0.80 | 24.00 | 75.20 |
| 6 | {3.2 | Benzylamine | 0.0166 | 0.66 | 490 | 0.30′ | 6 | 395 | 80.7 | 2.45 | 2.80 | 23.20 | 74.00 |
|   | {3.2 | Beta-phenyl- ethylamine. | 0.0166 | 0.66 | 505 | 1 | 6.15′ | 480 | 95.0 | 2.09 | 2.00 | 24.20 | 73.80 |
| 7 | 3 | Monomethyl- amine. | 0.013 | 0.66 | 490 | 0 | 4.30′ | 457 | 93.2 | 2.14 | 3.60 | 21.80 | 74.60 |

All the runs were carried out in benzene (1000, cc.) at 70° C.

EXAMPLE 8

Butadiene is polymerized with catalysts prepared by using 0.0182 mol of a titanium halide in 150 cc. anhydrous heptane and adding dropwise a solution of 0.0182 mol triethylaluminum in 100 cc. anhydrous heptane while stirring vigorously.

To the precipitate thus obtained an amount of an amine, in heptane solution, corresponding to about 1/10 mol in respect to the amount of titanium halide is added. The mixture is agitated for about 30 minutes, in order to allow an intimate contact of the solid with the amine, and the polymerization is then started by adding 100 g. buta- diene. From the very beginning of the introduction of bu- tadiene a very quick reaction is observed from the tem- perature increase and the pressure drop.

The polymerization is completed within times which vary, depending on the amine added, but are always much lower than the times of polymerization runs carried out without employing amines.

Moreover, it is noted that the polymers are always gelatinous masses, having a perfectly homogeneous aspect, which are easily and completely soluble in the common solvents (heptane, benzene, toluene, carbon disulfide, tetrahydronaphthalene, etc.). The molecular weights of the crude polymers, and of the fractions which can be ex- tracted therefrom with ether are of the same order, which demonstrates that the polymerization has a very regular course. The characteristics and the amounts of polymers obtained in the various cases are reported in Table III below, in comparison with the results obtained by pre- paring the catalyst in a similar way but without adding the amine. The polymers obtained using the last-men- tioned catalysts have, in general, a non-uniform granular aspect and are at most only partially soluble.

In both cases the polymers are amorphous by X-ray ex- amination and the distribution of the trans 1,4, cis 1,4 and 1,2 structures is similar.

Table III

| Run | Catalyst | Amine | Time, hours | Crude polymer Weight | Struc- ture trans 1,4, percent | By infrared cis 1,4 | Exam. 1,2, per- cent | Mol. weight, con- vent. | Ether extract Per- cent of the total | Mol. weight, con- vent. | Structure by infrared exam. Trans 1,4, per- cent | cis 1,4, per- cent | 1,2, per- cent |
|---|---|---|---|---|---|---|---|---|---|---|---|---|---|
| 6 | TiCl$_4$+Al(C$_2$H$_5$)$_3$ | Monomethylamine | 2 | 90 | 51.2 | 43.7 | 5.1 | 200,000 | 34.9 | 195,000 | 44 | 51 | 5 |
| 7 | TiCl$_4$+Al(C$_2$H$_5$)$_3$ | Primary trimethyl hexylamine. | 2 | 88 | 53.2 | 41.7 | 5.1 | 123,000 | 23 | 110,000 | 40.4 | 54.4 | 5.2 |
| 8 | TiCl$_4$+Al(C$_2$H$_5$)$_3$ | Secondary trimethyl hexylamine. | 4 | 80 | 51.4 | 37.6 | 5.9 | 180,000 | 30 | 170,000 | 56 | 38 | 6 |
| 9 | TiCl$_4$+Al(C$_2$H$_5$)$_3$ | Tertiary trimethyl hexylamine. | 6 | 85 | 48 | 47.6 | 4.4 | 260,000 | 22 | 250,000 | 51 | 46 | 3 |
| 10 | TiCl$_4$+Al(C$_2$H$_5$)$_3$ | Aniline | 2 | 86 | 46.8 | 48.5 | 4.7 | 215,000 | 43.6 | 200,000 | 44.8 | 51.3 | 3.9 |
| 11 | TiCl$_4$+Al(C$_2$H$_5$)$_3$ | Benzidine | 2 | 89 | 49.5 | 46.3 | 5.2 | 250,000 | 37.9 | 240,000 | 49.7 | 47 | 3.3 |
| 12 | TiCl$_4$+Al(C$_2$H$_5$)$_3$ | Dimethylaniline | 5 | 82 | 56.9 | 37.9 | 5.2 | 230,000 | 22.6 | 210,000 | 55 | 41 | 4 |
| 13 | TiCl$_4$+Al(C$_2$H$_5$)$_3$ | Pyridine | 2 | 95 | 50.2 | 45 | 4.8 | 215,000 | 31.5 | 210,000 | 52.2 | 42 | 5.8 |
| 14 | TiCl$_3$+Al(C$_2$H$_5$)$_3$ | Monoethylamine | 2 | 92 | 43.5 | 52 | 4.5 | 145,000 | 36 | 140,000 | 41 | 55.5 | 3.5 |
| 15 | TiBr$_4$+Al(C$_2$H$_5$)$_3$ | Pyridine | 2 | 93 | 39.6 | 56.3 | 4.1 | 120,000 | 25.2 | 115,000 | 38.2 | 57.4 | 4.4 |
| 16 | TiI$_4$+Al(C$_2$H$_5$)$_3$ | Monoethylamine | 2 | 97 | 6.5 | 81 | 12.5 | 150,000 | 72 | 145,000 | 4.7 | 83 | 12.3 |
|   | TiCl$_4$+Al(C$_2$H$_5$)$_3$ | | 12 | 50 | 55 | 40.4 | 4.6 | | 33.3 | 105,000 | 44.6 | 49.6 | 5.8 |
|   | TiCl$_3$+Al(C$_2$H$_5$)$_3$ | | 12 | 30 | 42 | 53 | 5 | | 30.6 | 100,000 | 40 | 55 | 5 |
|   | TiBr$_4$+Al(C$_2$H$_5$)$_3$ | | 12 | 40 | 33 | 64 | 3 | | 12.6 | 195,000 | 35.3 | 58.8 | 5.9 |
|   | TiI$_4$+Al(C$_2$H$_5$)$_3$ | | 12 | 60 | 8 | 80 | 12 | | 70 | 200,000 | 6 | 82 | 12 |

The compound of the transition metal used in preparing the catalyst is preferably a halide of the transition metals belonging to Groups IV to VI inclusive of the Mendeleeff Periodic Table, including titanium, zirconium, hafnium, thorium, vanadium, tantalum, niobium, chromium, mo- lybdenum, tungsten and uranium. The halide may be one in which the metal has the maximum valency cor- responding to its position in the Periodic Table and higher than 3, or it may be a solid, highly crystalline halide in which the metal has a valency lower than the maximum corresponding to its position in the Periodic Table, and not higher than 3.

The organometallic compound used in preparing the catalyst is a compound of an element of Groups I to III inclusive of the Mendeleeff Periodic Table in which at least all but one of the valencies of the metal are satisfied by alkyl groups containing 1 to 16 carbon atoms and the remaining valency if any is satisfied by an alkyl group as defined, an alkoxy group containing 2–4 carbon atoms, or halogen.

Solvents suitable for use in preparing the catalysts, and as the inert polymerization medium, include paraffinic hydrocarbons such as n-heptane, a light gasoline substantially free of olefinic bonds, iso-octane, n-pentane, etc. Anhydrous benzene may be used.

Any organic amine can be used as the activator for the catalyst system.

As already indicated, the activated catalysts of the invention are particularly useful for the polymerization of aliphatic alpha-olefins $CH_2=CHR$ where R is an alkyl radical containing 1 to 8 carbon atoms, and diolefins containing at least one vinyl double bond.

The activated catalysts prepared from the high valency transition metal halides such as $TiCl_4$ or $TiBr_4$, may be used in the polymerization of both the alpha-olefins and the diolefins. However, when the monomer is an alpha-olefin and it is desired to orient the polymerization to the production of a crude polymerizate prevailingly consisting of isotactic macromolecules as defined by Natta et al. (i.e., linear, regular head-to-tail macromolecules in which, for at least long sections of the chain, or for substantially the length of the chain, the tertiary asymmetric carbon atoms of successive monomeric units have the same steric configuration), the catalyst used is one prepared from a solid, highly crystalline halide of the transition metal in which the metal has a valency not higher than 3 (e.g., $TiCl_3$, $TiCl_2$, or a mixture of $TiCl_3$ and $TiCl_2$, or the corresponding low valency halides of Zr or V), and an alkyl compound of the Group I–III element, in which the alkyl groups contain 2 to 5 carbon atoms (such as triethyl aluminum, diethylmonochloro-aluminum, etc. or the corresponding alkyl compounds of beryllium or magnesium). That is to say, the activated catalysts of the invention can be used in the stereospecific polymerization process of Natta et al. as applied to the alpha-olefins, to increase the rate at which the stereospecific polymerization is initiated and proceeds.

The foregoing examples clearly demonstrate the effectiveness of the organic amines in eliminating the induction period and increasing the polymerization rate, using the catalysts prepared from the transition metal compounds and metallorganic compounds. Various changes and modifications can be made in details in practicing the invention without departing from the spirit thereof and we intend to include in the scope of the appended claims all such variations as may be apparent to those skilled in the art from the description and examples given herein.

We claim:

1. A process for the rapid stereospecific polymerization of an alpha-olefin selected from the group consisting of propylene and butene-1 to a polymerizate having a higher than normal content of isotactic macromolecules, which process comprises contacting the alpha-olefin, under polymerization conditions, with a catalyst prepared from a substantially solid, highly crystalline halide of titanium in which the metal has a valency not higher than 3, and an alkyl compound of aluminum in which the alkyl groups contain from 2 to 5 carbon atoms, and which catalyst is activated as the result of the inclusion of pyridine with one member selected from the group consisting of the titanium halide, the alkyl aluminum compound, and the catalyst from the titanium halide and alkyl aluminum compound, in an amount such that the molar ratio of the organic amine to the titanium halide is 0.05:1 to 1:1.

2. A catalyst for the accelerated stereospecific polymerization of alpha-olefins selected from the group consisting of propylene and butene-1, said catalyst being prepared from a substantially solid, highly crystalline halide of titanium in which the metal has a valency not higher than 3, and an alkyl aluminum compound in which the alkyl groups contain from 2 to 5 carbon atoms, and said catalyst being activated as the result of the inclusion of pyridine with one member selected from the group consisting of the titanium halide, the alkyl aluminum compound, and the catalyst formed, in an amount such that the molar ratio of the organic amine to titanium halide is from 0.05:1 to 1:1.

3. A process for the production of normally solid polypropylene which comprises polymerizing propylene with at least a catalytic amount of a catalyst prepared by mixing aluminum trialkyl with titanium trichloride, said polymerization being carried out in the presence of pyridine, the latter being present in an amount sufficient to increase the crystallinity of the resulting polymer.

4. In the polymerization of unsaturated hydrocarbons selected from the group consisting of propylene and butene-1 with catalysts prepared from solid, highly crystalline halides of titanium in which the metal has a valency not higher than 3, and alkyl aluminum compounds in which the alkyl groups contain from 2 to 5 carbon atoms, the improvement which consists in activating the catalyst and increasing the rate at which the polymerization is initiated and proceeds, by incorporating pyridine with one member selected from the group consisting of (1) the titanium halide, (2) the alkyl aluminum compound and (3) the catalyst formed from (1) and (2), the catalyst always comprising the two members (1) and (2) plus the pyridine, and the pyridine being used in an amount between 0.05 mol and 1.0 mol per mol of the titanium halide.

5. The improvement according to claim 4, characterized in that the pyridene is used in an amount between 0.05 mol and 0.2 mol per mol of crystalline titanium halide used in preparing the catalyst.

6. The improvement according to claim 4, characterized in that the unsaturated hydrocarbon polymerized is propylene.

7. The improvement according to claim 4, characterized in that the unsaturated hydrocarbon polymerized is butene-1.

References Cited in the file of this patent

UNITED STATES PATENTS

| | | |
|---|---|---|
| 2,586,812 | Gehrke | Feb. 26, 1952 |
| 2,786,036 | Freimiller | Mar. 19, 1957 |
| 2,833,755 | Coover | May 6, 1958 |
| 2,846,427 | Findlay | Aug. 5, 1958 |
| 2,905,645 | Anderson et al. | Sept. 22, 1959 |

FOREIGN PATENTS

| | | |
|---|---|---|
| 554,242 | Belgium | Jan. 17, 1957 |
| 809,717 | Great Britain | Mar. 4, 1959 |
| 148,848 | France | July 1, 1957 |